US009445365B2

United States Patent
Makharia et al.

(10) Patent No.: US 9,445,365 B2
(45) Date of Patent: Sep. 13, 2016

(54) REDUCING POWER CONSUMPTION IN VOICE OVER LTE TERMINALS USING SEMI PERSISTENT SCHEDULING IN CONNECTED DISCONTINUOUS RECEPTION MODE

(71) Applicant: Apple Inc., Cupertino, CA (US)

(72) Inventors: Shivesh Makharia, Santa Clara, CA (US); Sree Ram Kodali, Sunnyvale, CA (US); Navid Damji, Cupertino, CA (US); Thanigaivelu Elangovan, Santa Clara, CA (US); Luciano Verger, Santa Clara, CA (US); Madhusudan Chaudhary, Campbell, CA (US); Johnson O. Sebeni, Fremont, CA (US); Srinivasan Vasudevan, Sunnyvale, CA (US); Samy Khay-Ibbat, San Francisco, CA (US); Longda Xing, San Jose, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 14/153,675

(22) Filed: Jan. 13, 2014

(65) Prior Publication Data

US 2014/0198699 A1  Jul. 17, 2014

Related U.S. Application Data

(60) Provisional application No. 61/752,170, filed on Jan. 14, 2013.

(51) Int. Cl.
*H04W 52/02* (2009.01)
*H04W 76/04* (2009.01)
(Continued)

(52) U.S. Cl.
CPC ....... *H04W 52/0216* (2013.01); *H04W 52/028* (2013.01); *H04W 52/0229* (2013.01);
(Continued)

(58) Field of Classification Search
CPC ............... H04W 52/0216; H04W 52/0229; H04W 52/028; H04W 72/0413; H04W 72/12; H04W 72/1289; H04W 76/048
See application file for complete search history.

(56) References Cited

U.S. PATENT DOCUMENTS

| | | | |
|---|---|---|---|
| 2010/0150091 A1* | 6/2010 | Yu ....................... | H04W 72/042 370/329 |
| 2010/0195605 A1 | 8/2010 | Suzuki et al. | |
| 2013/0343265 A1* | 12/2013 | Ehsan ................... | H04J 3/0632 370/328 |

FOREIGN PATENT DOCUMENTS

| | | |
|---|---|---|
| EP | 2214442 | 8/2010 |
| EP | 2315486 | 4/2011 |

(Continued)

OTHER PUBLICATIONS

International Search Report and Written Opinion for PCT/US2014/011398, mailed Jul. 1, 2014, Apple Inc., pp. 1-13.

(Continued)

*Primary Examiner* — Awet Haile
(74) *Attorney, Agent, or Firm* — Meyertons Hood Kivlin Kowert & Goetzel, P.C.; Jeffrey C. Hood (57) ABSTRACT

A connection with a network that includes a base station (BS) may be established by a user device (UE) via a wireless connection, for conducting communications using semi persistent scheduling (SPS) in a connected discontinuous reception (C-DRX) mode. The SPS transmit periodicity may be adjusted with respect to the SPS activation command and the SPS interval UL (for uplink). Data may then be transmitted during the C-DRX On-Duration periods according to the determined SPS transmit periodicity. In some embodiments, the SPS transmit periodicity is adjusted such that following a first C-DRX On-Duration period when an SPS activation command is received, SPS data transmission occurs a specified number of subframes earlier during each subsequent C-DRX On-Duration period than in the first C-DRX On-Duration period. The SPS data transmission in each subsequent C-DRX On-Duration period may take place as soon as the UE device wakes up during the On-Duration period.

20 Claims, 7 Drawing Sheets

(51) Int. Cl.
*H04W 72/04* (2009.01)
*H04W 72/12* (2009.01)
*H04W 88/02* (2009.01)

(52) U.S. Cl.
CPC ....... *H04W72/0413* (2013.01); *H04W 76/048* (2013.01); *H04W 72/12* (2013.01); *H04W 72/1289* (2013.01); *H04W 88/02* (2013.01); *Y02B 60/50* (2013.01)

(56) References Cited

FOREIGN PATENT DOCUMENTS

| EP | 2658330 | 10/2013 |
|---|---|---|
| JP | 2012503900 | 2/2012 |
| JP | 2012512570 | 5/2012 |
| WO | 2012097692 | 7/2012 |

OTHER PUBLICATIONS

"Consideration of DRX and SPS Alignment", TSG-RAN WG2 #64bis, Jan. 12-16, 2009, pp. 1-6.
Written Opinion from PCT/US2014/011398, issued Dec. 18, 2014, Apple Inc., pp. 1-10.
International Preliminary Examination Report from International Application PCT/US2014/011398, issued Mar. 30, 2015, pp. 1-10.
Office Action for Japanese Patent Application No. 2015-552876, Jun. 14, 2016, pp. 1-5.

\* cited by examiner

REDUCING POWER CONSUMPTION IN VOICE OVER LTE TERMINALS USING SEMI PERSISTENT SCHEDULING IN CONNECTED DISCONTINUOUS RECEPTION MODE

PRIORITY CLAIM

This application claims benefit of priority of U.S. Provisional Patent Application Ser. No. 61/752,170 titled "Reducing Power Consumption in Voice over LTE Terminals using Semi Persistent Scheduling in Connected Discontinuous Reception Mode", filed on Jan. 14, 2013, which is hereby incorporated by reference as though fully and completely set forth herein.

FIELD OF THE INVENTION

The present application relates to wireless communication devices, and more particularly to methods for saving power in a radio receiver implemented in a wireless communications device.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. In general, wireless communication technologies, such as cellular communication technologies, are substantially designed to provide mobile communication capabilities to wireless devices generally powered by a portable power supply, e.g., a battery. Batteries hold a finite charge, and so in order to improve battery life of wireless devices, one approach is to reduce power consumption required to perform wireless communications. Accordingly, some wireless communication technologies implement features designed to conserve power while still providing a high-quality user experience. Generally speaking, portions of circuitry in a wireless may be powered down when not in use in order to save power and conserve battery life.

One significant consumer of power in a wireless device is transmitter and receiver circuitry (hereinafter 'wireless circuitry' or 'transceiver circuitry') that enables wireless communications. One example of a power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), WiMAX, etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE listens to the downlink (DL) packets following a specified pattern determined by the base-station (BS). In idle DRX (I-DRX) mode, the UE listens to the page from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

Another aspect of wireless data transmission is scheduling. In most cases, scheduling is fully dynamic. In a downlink direction, resources are assigned when data is available. For data to be sent in the uplink direction, the UE dynamically requests transmission opportunities whenever data arrives in the UE's uplink buffer. Information about data being sent in the downlink direction, and uplink transmission opportunities are carried in the radio layer control channel, which is sent at the beginning of each subframe. While dynamic scheduling is efficient for infrequent and bandwidth consuming data transmissions, which may result in large data bursts (e.g. web surfing, video streaming, emails), it is less suited for real time streaming applications such as voice calls. In the latter cases, data is sent in short bursts at regular intervals. If the data rate of the stream is very low, as is the case for voice calls, the overhead of the scheduling messages can become very high, as only little data is sent for each scheduling message.

One solution to this issue has been semi-persistent scheduling (SPS). Instead of scheduling each uplink or downlink transmission, a transmission pattern is defined instead of single opportunities. This significantly reduces the scheduling assignment overhead. During silence periods, the wireless voice CODECs in UEs stop transmitting voice data, and only send silence description information with much longer time intervals in between. During those times of silence the persistent scheduling can be switched-off. In the uplink, the SPS grant scheme is implicitly canceled if no data is sent for a network-configured number of empty uplink transmission opportunities. In downlink direction, SPS is canceled with an RRC (Radio Resource Control) message. While C-DRX offers a way to save battery power, and SPS offers a way to reduce scheduling overhead, there is room for further improving the performance and power consumption voice over LTE (VoLTE) terminals.

SUMMARY OF THE INVENTION

Embodiments described herein relate to a User Equipment (UE) device and associated method for saving power in a radio receiver implemented in a wireless communications device. A connection with a network that includes a base station may be established via a wireless connection. The communication may take place using semi persistent scheduling (SPS) in a connected discontinuous reception (C-DRX) mode. The SPS transmit periodicity may be adjusted with respect to the SPS activation command and the SPS interval UL (for uplink). Data may then be transmitted during the C-DRX On-Duration periods according to the determined SPS transmit periodicity. In some embodiments, the SPS transmit periodicity is adjusted such that following a first C-DRX On period when an SPS activation command is received, SPS data transmission occurs 4 subframes earlier during each subsequent C-DRX On-Duration period than in the first C-DRX On-Duration period. That is, SPS data transmission in each subsequent C-DRX On-Duration period may take place as soon as the UE device wakes up during the On-Duration period.

In some embodiments, there may be multiple subframes in a C-DRX On-Duration period, and due to loading, the network may prefer the UE to transmit at some other subframe in the C-DRX On-Duration period rather than at the first subframe in the C-DRX On-Duration period. The Network may inform the UE of this preference in the form of an SPS-Activation-Offset parameter through UE higher layer signaling such as RRC. The SPS-Activation-Offset may be applied after the SPS transmit periodicity has been adjusted based on the SPS activation command and the SPS interval UL, as set forth above. The SPS-Activation-Offset may be expressed in terms of subframes (e.g. 1 ms in certain embodiments), and the actual SPS transmission may take place as determined by the newly adjusted SPS transmit periodicity (based on the previously adjusted SPS transmit periodicity and the SPS-Activation-Offset) after the UE wakes up for the C-DRX On-Duration period. In some embodiments, the newly adjusted SPS transmit periodicity may take on the value of: the previously adjusted SPS transmit periodicity+SPS-Activation-Offset.

Accordingly, a wireless user equipment (UE) device may include a radio having one or more antennas for performing wireless communication, and a processing element coupled to the radio and capable of adjusting a semi persistent scheduling (SPS) transmit periodicity with respect to an SPS activation command and SPS interval. The radio and the processing element may interoperate to establish a connection with a network via a wireless link, communicate with the network via the wireless link using connected-mode discontinuous reception (C-DRX) and SPS, and transmit data during C-DRX On-Duration periods, beginning each data transmission at a respective point in time determined according to the adjusted SPS transmit periodicity. The processing element may also be capable of adjusting the SPS transmit periodicity to cause the radio and the processing element to begin transmitting data as soon as the UE wakes up during a C-DRX On-Duration period. The radio and the processing element may also interoperate to begin transmitting data a specified number of subframes following reception of an SPS activation command during a C-DRX On-Duration period when the SPS activation command is received.

In some embodiments, the processing element may readjust the SPS transmit periodicity according to the adjusted SPS transmit periodicity and an SPS Activation Offset value. The radio and the processing element may further interoperate to receive, as part of communication with the network via the wireless link, the SPS Activation Offset value from the network, and also receive the SPS Activation Offset value through higher layer signaling.

According to various embodiments, a method for reducing power consumption in a wireless UE device may include

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

BLER: Block Error Rate (same as Packet Error Rate)
BER: Bit Error Rate
BS: Base Station
C-DRX: Connected Discontinuous Reception
CRC: Cyclic Redundancy Check
DL: Downlink
DRX: Discontinuous Reception
GSM: Global System for Mobile Communication
LTE: Long Term Evolution
PDCCH: Physical Downlink Control Channel
PDSCH: Physical Downlink Shared Channel
PER: Packet Error Rate
PUCCH: Physical Uplink Control Channel
PUSCH: Physical Uplink Shared Channel
SFN: System Frame Number
SINR: Signal to Interference-and-Noise Ratio
SIR: Signal to Interference Ratio
SNR: Signal to Noise Ratio
SPS: Semi Persistent Scheduling Tx: Transmission UE: User Equipment UL: Uplink UMTS: Universal Mobile Telecommunication System VoLTE: Voice over LTE Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
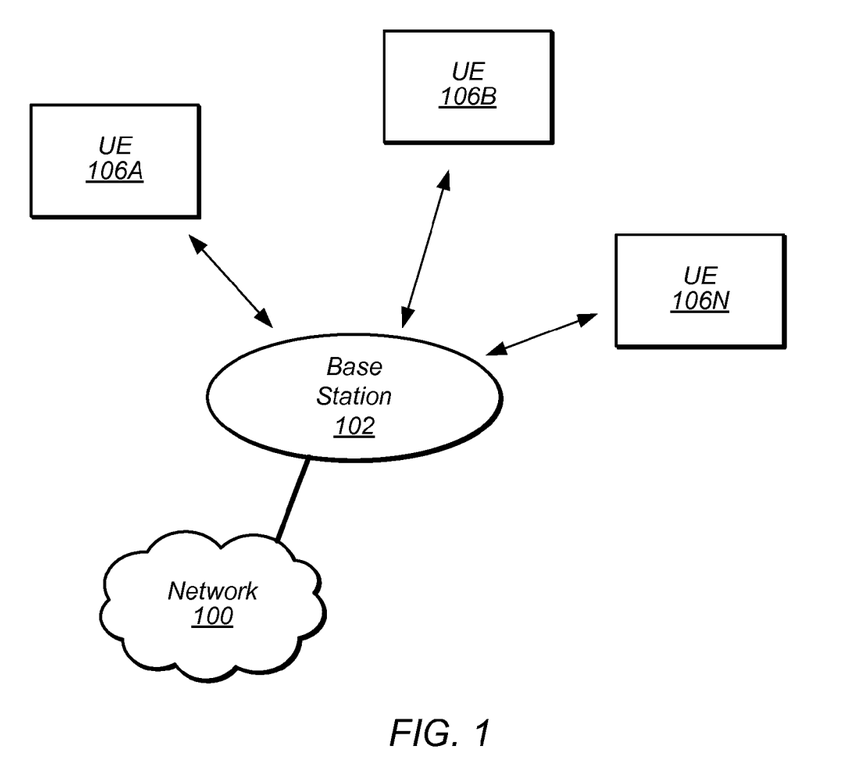
FIG. 1 illustrates an exemplary (and simplified) wireless communication system.
Figure 2:
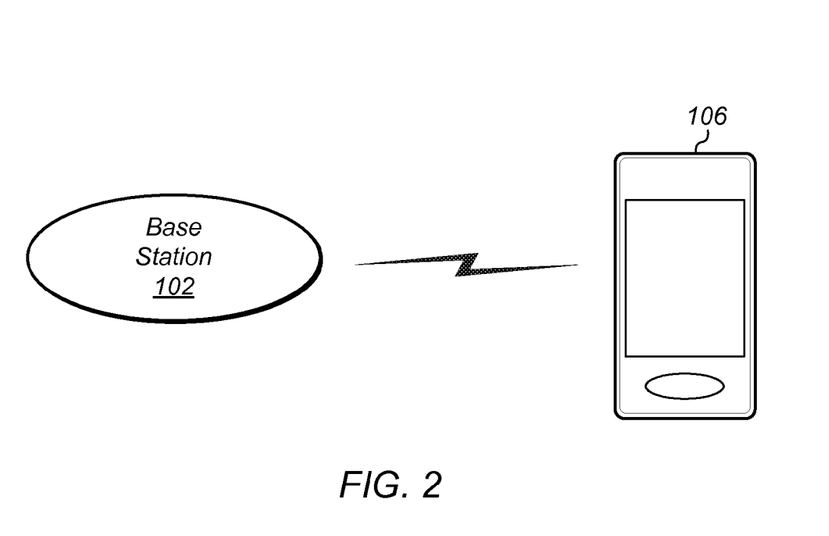
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell."

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Thus in some embodiments, the UE 106 might be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and Bluetooth. Other configurations are also possible.

Figure 3:
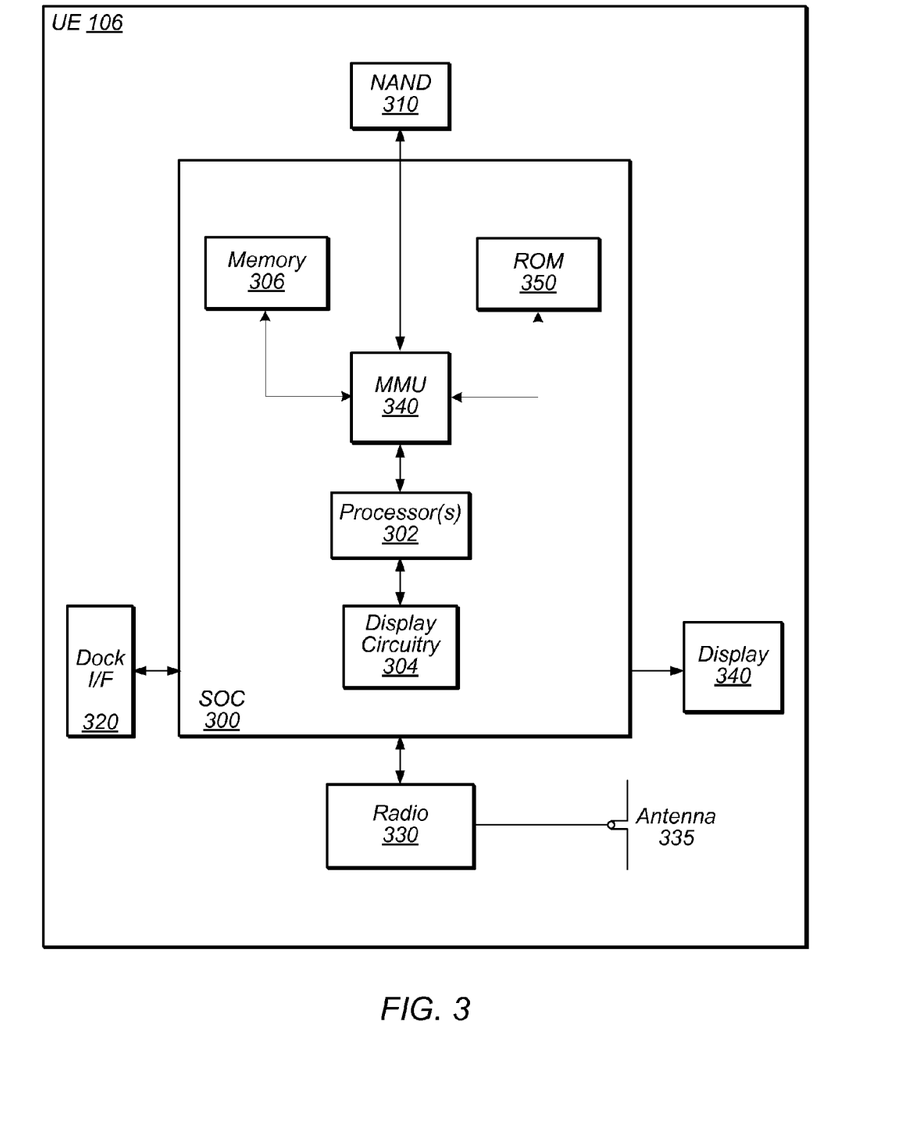
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing a method for performing C-DRX cycle scaling. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components as shown in FIG. 3, to reduce power consumption in VoLTE terminals using SPS in C-DRX mode, as will be further described below in the section "Saving Power for VoLTE Terminals".

Figure 4:
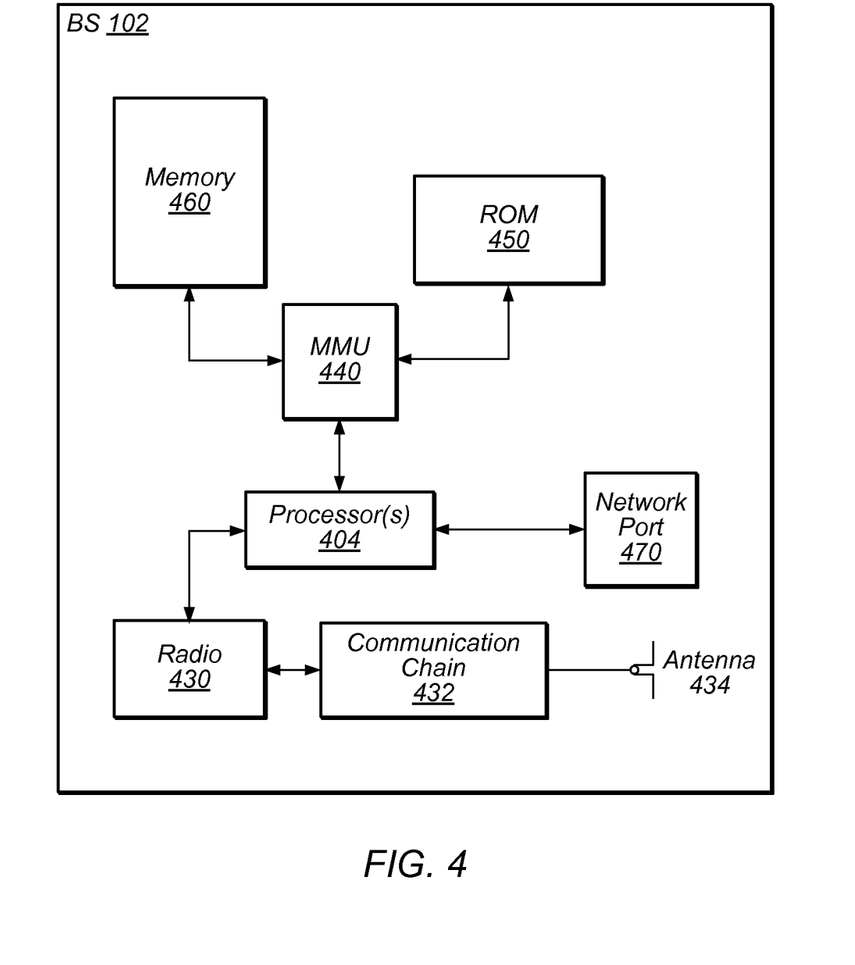
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

DRX

The parameters for DRX cycles may be configured by the BS through different timers. The DRX inactivity timer indicates the time in number of consecutive subframes to wait before enabling DRX. Short DRX cycles and long DRX cycles are defined to allow the BS to adjust the DRX cycles based on the applications. In generation, a DRX short cycle timer may be defined to determine when to transition to the long DRX cycle. When there is no reception of packets for an extended period of time after the successful reception of a packet, the BS may initiate RRC connection release and the UE may enter the RRC IDLE state, during which the idle DRX can be enabled. The On-Duration timer may be used to determine the number of frames over which the UE will read the DL control channel every DRX cycle before entering power saving mode. The allowed values are 1, 2, 3, 4, 5, 6, 8, 10, 20, 30, 40, 50, 60, 80, 100, and 200. During idle DRX mode, the UE may monitor one paging occasion (PO) per DRX cycle, which is one sub frame.

Figure 5:
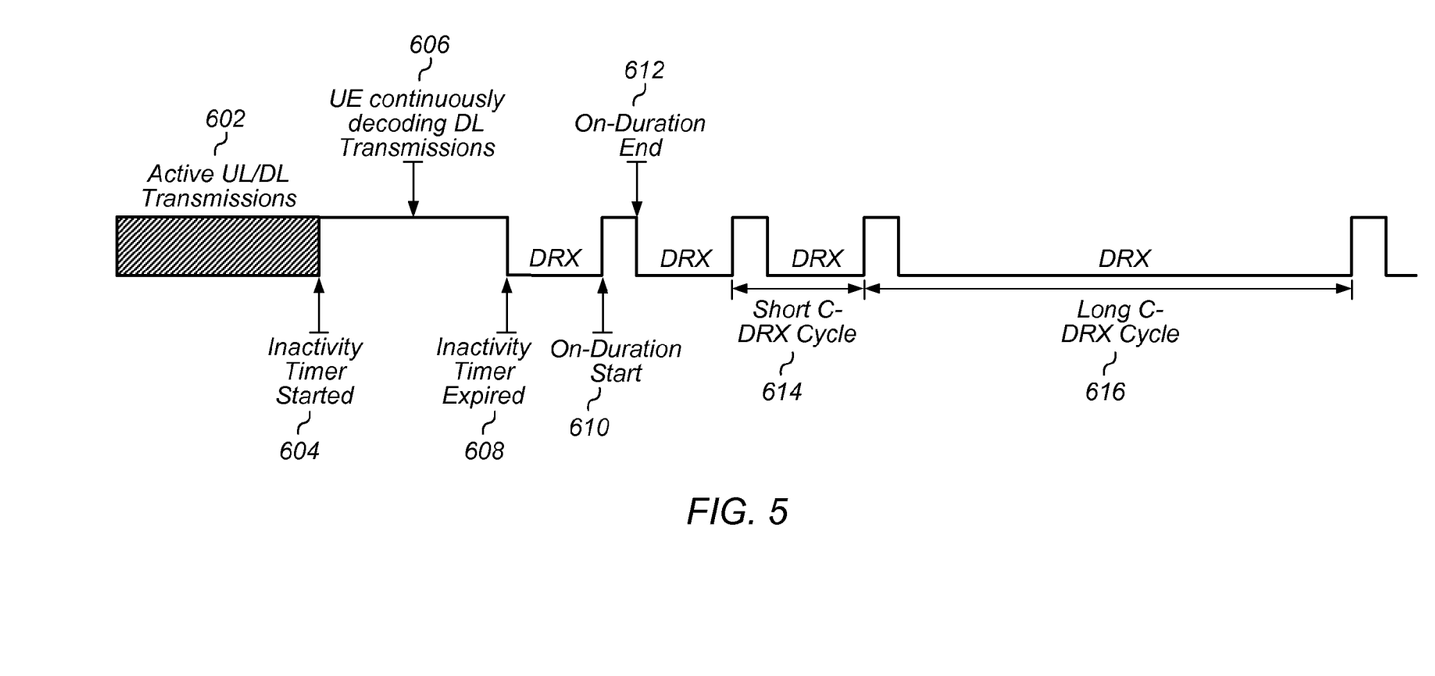
FIG. 5 is timing diagram illustrating general operations of a C-DRX capable UE over a period of time.

FIG. 5 illustrates various aspects of general C-DRX operation. As indicated by 602, the UE 106 may operate in an active state and may perform one or more uplink and/or downlink (UL/DL) transmissions (e.g., transmit uplink data and/or receive downlink data). At 604, an inactivity timer may be initiated. The inactivity timer may be initiated at the end of the active transmissions in 602. Note that the inactivity timer may have been initiated one or more times during the active transmissions in 6502, but may have been reset each time as a result of continuing activity (transmissions) until no more activity was observed at 604, at which point it may run until expiration at 608. The inactivity timer may have any length, as desired; some examples of possible inactivity timer length might include 100 ms, 80 ms, 50 ms, 40 ms, or any other value, e.g., as specified by the 3GPP 36.331 specification.

In 606, between initiation (at 604) and expiration (at 608) of the inactivity timer, the UE 106 may not be performing any uplink or downlink transmissions, but may continue to operate in the active state, and may monitor one or more communication channels (e.g., a PDCCH) for downlink grants. At 608, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 610, the UE 106 may "wake-up" and re-enter the active state. The UE 106 may wake up at a time specified by a schedule, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP 36.331 specification; alternatively, the on-duration may last until certain functions have been performed, and may end when no further specified functions need to be performed. At 612, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 614 (which may last 20 ms, 40 ms, 80 ms, or any other length of time), and if no uplink or downlink transmission are performed by the end of the pre-determined number of cycles, the UE 106 may perform one or more "long C-DRX" cycles 616 (which may last 80 ms, 160 ms, 320 ms, or any other length of time, e.g., as specified by 3GPP 36.331), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles.

If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

Saving Power for VoLTE Terminals

Figure 6:
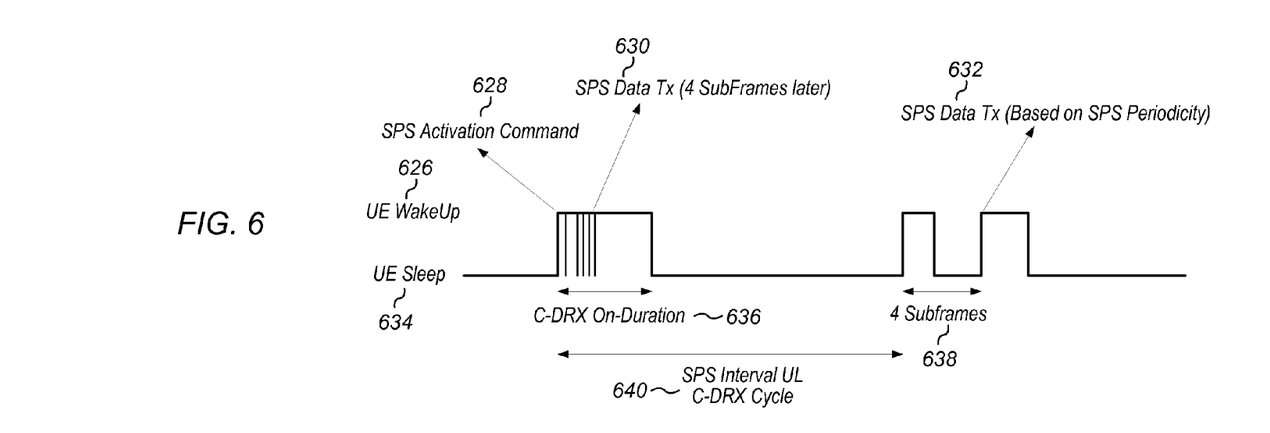
FIG. 6 is a timing diagram illustrating SPS data transfer while operating in C-DRX mode, according to one embodiment.

Communication, for example between a UE and a BS may occur in C-DRX mode using SPS. FIG. 6 shows a timing diagram illustrating SPS data transfer while operating in C-DRX mode, according to one embodiment. As seen in FIG. 6, at first the UE may be in Sleep mode (634) during C-DRX operation, until it receives an SPS Activation command (328) during the C-DRX On-Duration period (636). This causes the UE to wake up (626), in other words, causes the UE to transition to a Talk state from a Listen state. As shown in FIG. 6, the UE starts the SPS data transfer 4 subframes later (630). However, the timing scheme illustrated in FIG. 6 may result in extra long wake-up times (maximum of 4 subframes) during the C-DRX On-Duration (636) when the UE does not send voice data due to SPS periodicity, during the upload cycle (640). In other words, once the SPS activation command (628) has been received, during each subsequent C-DRX On-Duration period the UE may not start the SPS data transfer (632) until 4 subframes (638) following the start of the C-DRX On-Duration period (636). It would be desirable to start transmission as soon as the UE or device wakes up (626) during the C-DRX On-Duration period (636).

Figure 7:
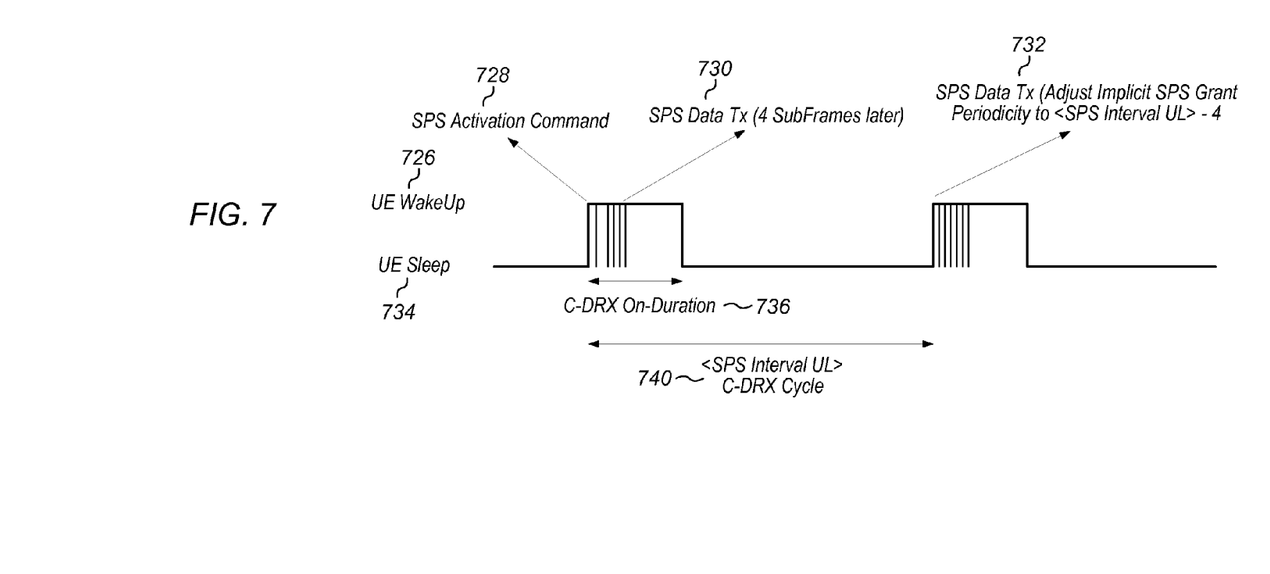
FIG. 7 is a timing diagram illustrating SPS data transfer while operating in C-DRX mode, according to another embodiment.

FIG. 7 is a timing diagram illustrating SPS data transfer while operating in C-DRX mode, according to another embodiment, in which transmission is not delayed in each C-DRX On-Duration period, thereby reducing power consumption. As seen in FIG. 7, at first the UE may be in Sleep mode (734) during C-DRX operation, until it receives an SPS Activation command (728) during the C-DRX On-Duration period (736), similar to what is shown in FIG. 6. This again causes the UE to wake up (726), and transition to a Talk state from a Listen state. Thus, UE starts the SPS data transmission (SPS Tx) four subframes later (730). However, as shown in FIG. 7, subsequent SPS data transmission is implicitly shifted by 4 subframes with respect to the SPS Interval UL (uplink) C-DRX cycle (732) to allow immediate transmission of data as soon as the UE or device wakes up during the C-DRX On-Duration over the course of the SPS Interval UL C-DRX cycle (740). That is, the SPS Grant Periodicity may be implicitly adjusted to be four subframes less than the actual duration of the SPS Interval UL C-DRX cycle (740). The SPS transmit periodicities may therefore be expressed with respect to the SPS activation command, with the exception of the first SPS transmission (730), when the SPS activation command (728) is received.

Accordingly, in one set of embodiments, after a Semi-Persistent uplink assignment is configured, the UE may consider that the grant recurs in each subframe for which: (10*SFN+subframe)=[(10*SFNstart time+subframe start time)+(N*SPS Interval UL)−4] modulo 10240, for all N>0. This establishes the SPS transmit periodicity with respect to the SPS Activation command. The "SFNstart time" and "subframe start time" represent the SFN and subframe, respectively, at the time the configured uplink grant was (re)initialized.

Figure 8:
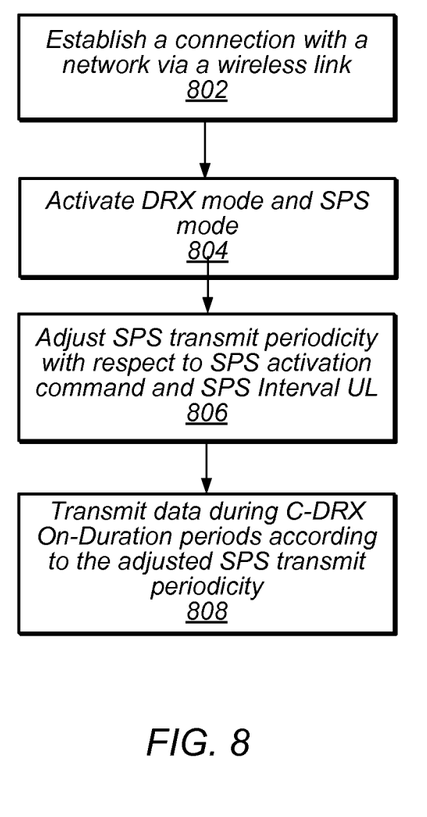
FIG. 8 is a flowchart diagram illustrating a method for configuring SPS and C-DRX to reduce power consumption in VoLTE terminals, according to one embodiment.

FIG. 8 shows a flowchart diagram illustrating one embodiment of a method for wireless communication that uses SPS in C-DRX mode, and reduces power consumption in VoLTE terminals. A UE may establish a connection with a network that may include a BS, via a wireless link (802). The UE may configure itself to operate in C-DRX mode and use SPS (804). As part of the SPS in C-DRX mode, the UE may adjust the SPS transmit periodicity with respect to the SPS activation command and the SPS Interval UL (806). Specifically, the UE may adjust the SPS transmit periodicity to allow SPS data transmission to commence as soon as the UE wakes up during each C-DRX On-Duration period, with the exception of a first C-DRX On-Duration period during which the UE receives the SPS activation command. The UE may therefore transmit data during C-DRX On-Duration periods according to the adjusted SPS transmit periodicity (808).

In one set of embodiments, after a Semi-Persistent uplink assignment is configured, the UE may consider that the grant recurs in each subframe for which: (10*SFN+subframe)= [(10*SFNstart time+subframe start time)+(N*SPS Interval UL)−4+SPS-Offset-Activation] modulo 10240, for all N>0. The "SFNstart time" and "subframe start time" again represent the SFN and subframe, respectively, at the time the configured uplink grant was (re-)initialised. The network may communicate, i.e. configure the SPS-Offset-Activation at the UE through higher layer signaling, such as RCC, for example.

Figure 9:
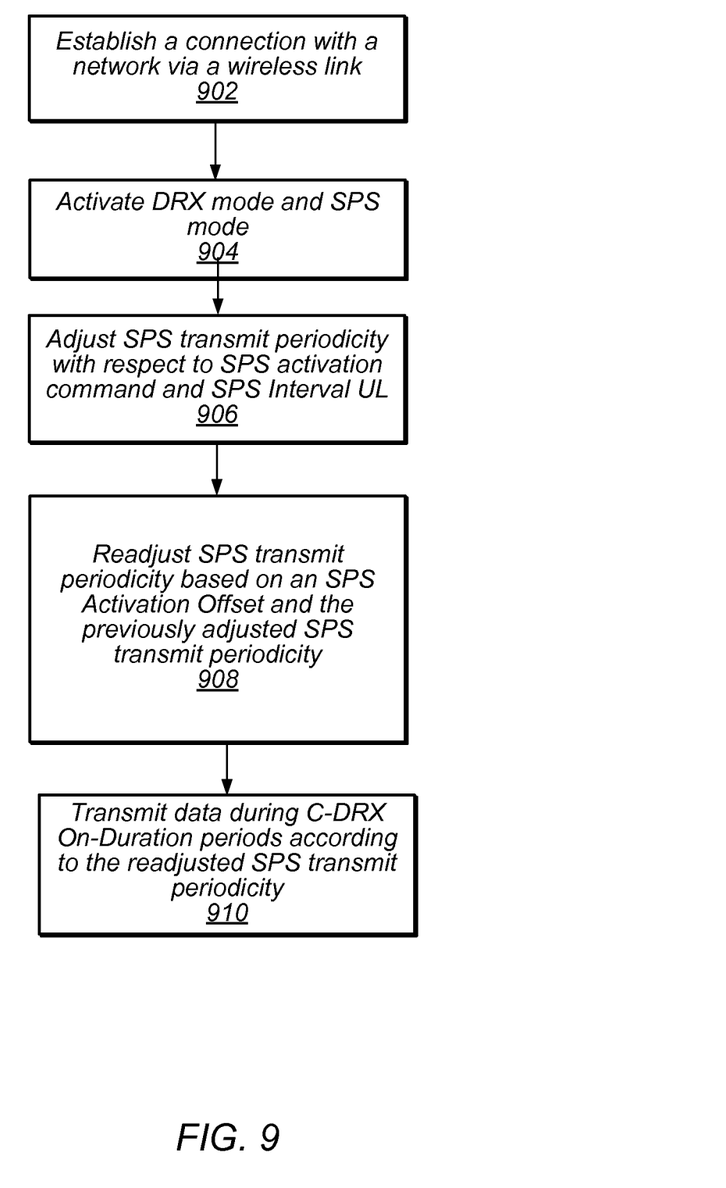
FIG. 9 is a flowchart diagram illustrating a method for configuring SPS and C-DRX to reduce power consumption in VoLTE terminals, according to another embodiment.

FIG. 9 shows a flowchart diagram illustrating one embodiment of a method for wireless communication that uses SPS in C-DRX mode, and reduces power consumption in VoLTE terminals by having a network communicate an SPS Offset Activation value to a UE through higher layer signaling. A UE may establish a connection with a network that may include a BS, via a wireless link (902). The UE may configure itself to operate in C-DRX mode and use SPS (904). As part of the SPS in C-DRX mode, the UE may calculate the SPS transmit periodicity with respect to the SPS activation command and the SPS Interval UL (906), in a manner similar to what is shown in 806 of the flowchart diagram of FIG. 8. However, the network may prefer the UE to transmit at some other subframe in the C-DRX On-Duration period rather than at the first subframe in the C-DRX On-Duration period due to a variety of reasons. For example, there may be multiple subframes in a C-DRX On-Duration period, and the network may prefer the UE to transmit at another frame in the C-DRX On-Duration period due to loading. The UE may therefore further adjust the SPS transmit periodicity based on the previously adjusted SPS transmit periodicity and an SPS Activation Offset parameter (908). In some embodiments, the network may communicate the value of the SPS Activation Offset parameter through higher layer signaling, e.g. through RCC. The UE may therefore transmit data during C-DRX On-Duration periods according to the readjusted SPS transmit periodicity (910).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless user equipment (UE) device, the UE comprising:
   radio circuitry, comprising one or more antennas for facilitating wireless communications; and
   a processing element, coupled to the radio circuitry, and configured to interoperate with the radio circuitry to cause the UE device to:
      adjust a semi persistent scheduling (SPS) transmit periodicity with respect to an SPS activation command and SPS interval;
      establish a connection with a network via a wireless link;
      communicate with the network via the wireless link using connected-mode discontinuous reception (C-DRX) and SPS;
      transmit data during a first C-DRX On-Duration period, beginning data transmission after a first time delay relative to a beginning of the first C-DRX On-Duration period; and
      transmit data during one or more respective C-DRX On-Duration periods subsequent to the first C-DRX On-Duration period, beginning each data transmission after a respective time delay relative to a beginning of the respective C-DRX On-Duration period, wherein the respective time delay is determined according to the adjusted SPS transmit periodicity and is different from the first time delay;
      wherein the first C-DRX On-Duration period and the one or more respective C-DRX On-Duration periods correspond to the SPS activation command.

2. The UE of claim 1, wherein the processing element is configured to interoperate with the radio circuitry to cause the UE device to adjust the SPS transmit periodicity and begin transmitting data as soon as the UE wakes up during the one or more respective C-DRX On-Duration periods.

3. The UE of claim 1, wherein beginning data transmission after a first time delay relative to the beginning of the first C-DRX On-Duration period comprises beginning data transmission, during the first C-DRX On-Duration period, following a specified number of subframes after reception of the SPS activation command.

4. The UE of claim 1, wherein the processing element is configured to interoperate with the radio circuitry to cause the UE device to readjust the SPS transmit periodicity according to:
   the adjusted SPS transmit periodicity; and
   an SPS Activation Offset value with respect to a first subframe of one of the one or more respective C-DRX On-Duration periods.

5. The UE of claim 4, wherein the radio circuitry and the processing element are further configured to interoperate to cause the UE device to receive, as part of communication with the network via the wireless link, the SPS Activation Offset value from the network.

6. The UE of claim 5, wherein the radio circuitry and the processing element are further configured to interoperate to cause the UE device to receive the SPS Activation Offset value through higher layer signaling.

7. A method for reducing power consumption in a wireless user equipment (UE) device, the method comprising:
   adjusting a semi persistent scheduling (SPS) transmit periodicity with respect to an SPS activation command and SPS interval;
   establishing, by a UE device, a connection with a network via a wireless link;
   communicating, by the UE device, with the network via the wireless link using connected-mode discontinuous reception (C-DRX) and SPS;
   transmitting data, by the UE device, during a first C-DRX On-Duration period, beginning data transmission after a first time delay relative to a beginning of the first C-DRX On-Duration period; and
   transmitting data, by the UE device, during one or more respective C-DRX On-Duration periods subsequent to the first C-DRX On-Duration period, beginning each data transmission after a respective time delay relative to a beginning of the respective C-DRX On-Duration period, wherein the respective time delay is determined according to the adjusted SPS transmit periodicity and is different from the first time delay;
   wherein the first C-DRX On-Duration period and the one or more respective C-DRX On-Duration periods correspond to the SPS activation command.

8. The method of claim 7, further comprising:
   beginning transmitting data, by the UE device, at least in response to adjusting the SPS transmit periodicity, as soon as the UE wakes up during each of the one or more respective C-DRX On-Duration periods.

9. The method of claim 7, further comprising:
   beginning transmitting data, by the UE device, during the first C-DRX On-Duration period, following a specified number of subframes after reception of the SPS activation command.

10. The method of claim 7, further comprising:
    readjusting the SPS transmit periodicity according to:
       the adjusted SPS transmit periodicity; and
       an SPS Activation Offset value with respect to a first subframe of one of the one or more respective C-DRX On-Duration periods.

11. The method of claim 10, further comprising:
    receiving, by the UE device, as part of communication with the network via the wireless link, the SPS Activation Offset value from the network.

12. The method of claim 11, further comprising:
    receiving, by the UE device, the SPS Activation Offset value through higher layer signaling.

13. A wireless communication system comprising:
    a base station; and
    a wireless user equipment (UE) device configured to wirelessly communicate with the base station, and further configured to:
       adjust a semi persistent scheduling (SPS) transmit periodicity with respect to an SPS activation command and an SPS interval;
       establish a connection with the base station via a wireless link;
       communicate with the base station via the wireless link using connected-mode discontinuous reception (C-DRX) and SPS;
       transmit data during a first C-DRX On-Duration period, beginning data transmission after a first time delay relative to a beginning of the first C-DRX On-Duration period; and transmit data during one or more respective C-DRX On-Duration periods subsequent to the first C-DRX On-Duration period, beginning each data transmission after a respective time delay relative to a beginning of the respective C-DRX On-Duration period, wherein the respective time delay is determined according to the adjusted SPS transmit periodicity and is different from the first time delay;

wherein the first C-DRX On-Duration period and the one or more C-DRX On-Duration periods correspond to the SPS activation command.

14. The wireless communication system of claim 13, wherein at least in response to having adjusted the SPS transmit periodicity, the UE device is further configured to begin transmitting data as soon as the UE wakes up during each of the one or more respective C-DRX On-Duration periods.

15. The wireless communication system of claim 13, wherein the UE device is configured to begin transmitting data, during the first C-DRX On-Duration period, following a specified number of subframes after reception of the SPS activation command.

16. The wireless communication system of claim 13, wherein the UE device is further configured to readjust the SPS transmit periodicity according to:
the adjusted SPS transmit periodicity; and
an SPS Activation Offset value with respect to a first subframe of one of the one or more respective C-DRX On-Duration periods.

17. The wireless communication system of claim 16, wherein the UE device is further configured to receive, as part of communication with the base station via the wireless link, the SPS Activation Offset value from the base station.

18. The wireless communication system of claim 17, wherein the UE device is further configured to receive the SPS Activation Offset value through higher layer signaling.

19. The wireless communication system of claim 13, further comprising a telecommunications network, wherein the base station is configured to facilitate communication between the UE device and the telecommunications network.

20. The wireless communication system of claim 13, further comprising one or more additional UE devices, each respective UE device of the one or more additional UE devices configured to wirelessly communicate with the base station, and further configured to:
establish a connection with the base station via a respective wireless link;
determine a respective SPS transmit periodicity according to a respective SPS interval for uplink and a respective SPS activation command received by the respective UE device;
communicate with the base station using SPS in a C-DRX mode, comprising transmitting SPS data during each respective subsequent C-DRX On-Duration period following a respective initial C-DRX On-Duration period according to the determined respective SPS transmit periodicity, comprising transmitting SPS data a specified number of subframes earlier during each respective subsequent C-DRX On-Duration period than during the respective initial C-DRX On-Duration period.

* * * * *